United States Patent
Yaddula et al.

(10) Patent No.: US 7,164,483 B2
(45) Date of Patent: Jan. 16, 2007

(54) OPTIMAL APPROACH TO PERFORM RASTER OPERATIONS

(75) Inventors: Sandeep Yaddula, Columbia, MD (US); Gaganjot Singh Maur, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 901 days.

(21) Appl. No.: 10/259,098

(22) Filed: Sep. 27, 2002

(65) Prior Publication Data

US 2003/0164969 A1   Sep. 4, 2003

Related U.S. Application Data

(60) Provisional application No. 60/357,111, filed on Feb. 19, 2002.

(51) Int. Cl.
*B41B 1/00*   (2006.01)
*G06F 15/00*   (2006.01)
*G09G 5/37*   (2006.01)

(52) U.S. Cl. ............... 358/1.13; 358/1.9; 345/561; 345/562

(58) Field of Classification Search ............... 358/1.13, 358/1.9; 345/561, 562
See application file for complete search history.

(56) References Cited

U.S. PATENT DOCUMENTS

| | | | | |
|---|---|---|---|---|
| 6,046,748 | A * | 4/2000 | Horowitz et al. | 345/596 |
| 6,078,339 | A * | 6/2000 | Meinerth et al. | 345/522 |
| 6,972,770 | B1 * | 12/2005 | Cohen et al. | 345/562 |
| 2003/0098987 | A1 * | 5/2003 | Fiske | 358/1.13 |

* cited by examiner

*Primary Examiner*—Kimberly Williams
*Assistant Examiner*—Charlotte M. Baker
(74) *Attorney, Agent, or Firm*—Robert D. Marshall, Jr.; W. James Brady; Frederick J. Telecky, Jr.

(57) ABSTRACT

Raster operations (ROPs) are executed using a few core blocks which implement the logical operations (e.g., AND, OR, XOR) forming the basis for the raster operations. In an embodiment, the core blocks are generated only for the basic Boolean operations namely AND, OR and XOR for the corresponding operands (one or two of the source, paint and destination). Each logical operation is performed by using the appropriate core block.

15 Claims, 2 Drawing Sheets

OPTIMAL APPROACH TO PERFORM RASTER OPERATIONS

This application claims priority under 35 USC §119(e)(1) of Provisional Application No. 60/357,111, filed Feb. 19, 2002.

BACKGROUND OF THE INVENTION

1. Field of the Invention

The present invention relates to printers, and more specifically to a method and apparatus for performing raster operations in a printer.

2. Related Art

Printers are often used to print a specified content ("page content") on medium such as paper. Typically, a printer receives a request from an external system such as a personal computer, and prints the content specified in the request. The content to be printed is generally specified by page description languages (PDL), as is well known in the relevant arts.

An interpreter (within a printer) generally converts the statements in PDL to a corresponding display list. A display list contains low level primitives (elements) such as lines and trapezoids which can be used to represent various high level objects such as images and fonts. Bit maps are generated based on the primitives in the display lists by, what is commonly referred to as, rendering. A printer engine, within the printer, then prints the bitmap on paper.

PDLs such as Printer Control Language (PCL, specified by Hewlett Packard Company, www.hp.com) often define various raster operations (ROPs) to be applied while rendering. The ROPs specify the manner in which source, paint and destination need to be combined to obtain the final bitmap (representing the page content) which has to be printed. As is well known, a destination generally refers to a bit-map formed by rendering the display-list elements up to that point of time. A source refers to a current display list element being rendered, and paint refers to the shade of color or the pattern bit-map that the source may be filled with.

In the PCL based systems, a total of 256 ROPs are known to be defined. For further information on PCL the reader is referred to a document entitled, "PCL XL Feature Reference: Protocol Class 2.0", available from Hewlett-Packard Company (www.hp.com), which is incorporated in its entirety herewith.

In general, raster operations need to be implemented while satisfying (or balancing) several requirements. One general requirement is that the raster operations be performed quickly. Another typical requirement is that the implementation be easily portable to better (e.g., faster) environments (e.g., a processor which operates at a higher speed). In systems implemented substantially in the form of software, there may be a requirement to minimize the memory requirements. Therefore, what is needed is a method and apparatus to perform raster operations while meeting one or more of such requirements.

SUMMARY OF THE INVENTION

The present invention allows raster operations to be performed in printers using combinations of source, paint and destination operands. As is well known, each raster operation specifies one or more logical operations to be executed on corresponding operands. For example, a raster operation may indicate that an XOR logical operation be performed on source and destination, and a logical OR be performed using the result of XOR logical operation and paint.

According to an aspect of the present invention, core blocks are implemented to execute logical operations such as AND, OR and XOR. The core blocks thus implemented are used for executing each logical operation. Thus, a raster operation may be performed by using the core blocks with the appropriate operands consistent with the raster operation.

In one implementation, an intermediate code is generated for each raster operation, with the intermediate code specifying the order in which the logical operations are to be performed and the corresponding operands. The intermediate code is then examined to execute the logical operations using the corresponding core blocks. In one embodiment, the core blocks and the logic which initiates the use of the core blocks are implemented in the form of software instructions.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention provides a flexible approach for executing raster operations (ROPs) by using only a few core blocks which implement the logical operations (e.g., AND, OR, XOR) forming the basis for the raster operations. The underlying computing environment can be optimized (minimize processing power, increase throughput performance, and/or minimize memory usage) to implement the core blocks, with the result that the raster operations can also be executed meeting a desired set of requirements.

For example, porting of an implementation from one processor to a faster processor may merely require ensuring that the core blocks are supported by the faster processor. As another example, specialized circuitry (potentially application specific integrated circuits) may be employed to perform just the core blocks.

As the overhead of implementation of the core blocks could be substantially less compared to the overhead of implementation of the entire raster operations (due to the less number), printers may be implemented quickly using the present invention. In addition, the implementations may be optimized to meet desired requirements as noted above.

Several aspects of the invention are described below with reference to example environment(s) for illustration. It should be understood that numerous specific details, relationships, and methods are set forth to provide a full understanding of the invention. One skilled in the relevant art, however, will readily recognize that the invention can be practiced without one or more of the specific details, with other methods, and/or in other environments etc. In other instances, well-known structures or operations are not shown in detail to avoid obscuring the invention.

2. Example Printer

Figure 1:
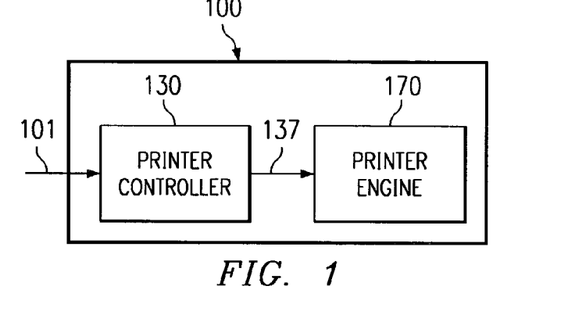
FIG. 1 is a block diagram illustrating the details of an example printer.

FIG. 1 is a block diagram illustrating the details of an embodiment of printer 100 in accordance with the present invention. Printer 100 is shown containing printer controller 130 and printer engine 170. Each component is described in further detail below.

Printer engine 170 receives on path 137 a bitmap (representing the page content to be printed) suitable in format for printing, and prints the bit map on medium such as paper. Printer engine 170 can be implemented in a known way. In an embodiment, printer engine 170 is implemented using laser technology.

Printer controller 130 may receive statements (defining a page content to be printed) on path 101, and generates a bitmap representing the page content. Printer controller 130 sends the generated bit maps on path 137. The statements may be received from an external computer system (not shown), and be specified in a page description language (PDL) such as Printer Control Language (PCL), well known in the relevant arts.

PDLs often define various raster operations (ROPs) to be applied while rendering a corresponding bit map. The ROPs specify the manner in which source, paint and destination may be combined to obtain the bitmap generated on line 137. The manner in which printer controller 130 may perform the various ROPs to generate a bitmap on line 137 is described below in further detail.

3. Method

Figure 2:
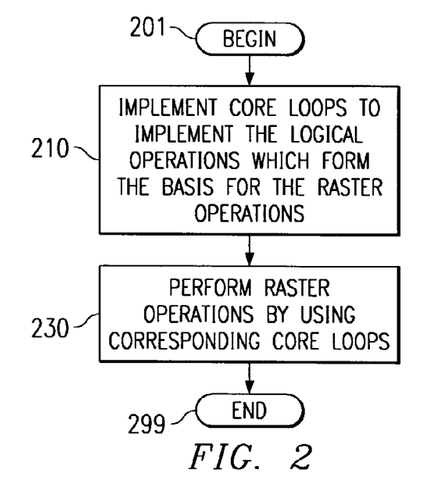
FIG. 2 is a flow chart illustrating a method implemented in accordance with an aspect of the present invention.

FIG. 2 is a method illustrating the manner in which the raster operations may be performed according to an aspect of the present invention. The method is described with reference to printer 100 of FIG. 1 for illustration. However, the method can be implemented in other environments as well. The method begins in step 201, in which control immediately passes to step 210.

In step 210, core blocks are implemented to perform logical operations which form the basis of all the raster operations. The logical operations in turn use the operands of raster operations or results of other logical operations, as operands. As may be appreciated, each operand can contain potentially many bytes of data representing an image portion (source. paint or destination).

In step 230, the raster operations are performed by using the corresponding core blocks required for the particular ROP. Multiple core blocks can be potentially used to execute each ROP. The operands may be passed as parameters to each execution of a core block. The manner in which raster operations may be performed is described below in further detail.

4. Performing Raster Operations

Figure 3:
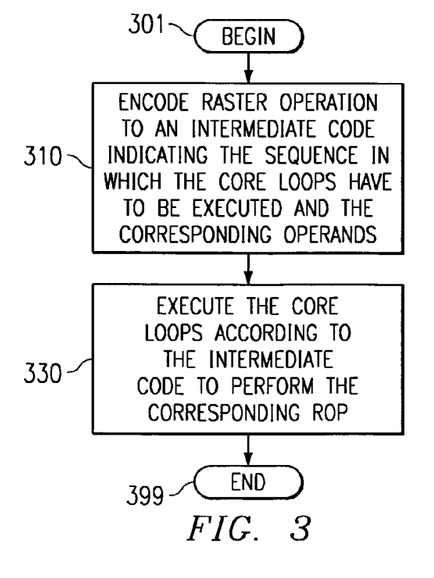
FIG. 3 is a flow chart illustrating the manner in which the raster operations are performed according to an aspect of the present invention.

FIG. 3 is a flow chart illustrating the manner in which each raster operation may be performed using the implemented core blocks (step 230 above). The method begins in step 301, in which control immediately passes to step 310.

In step 310, the raster operations are encoded in an intermediate code indicating the sequence in which the core blocks have to be executed and the corresponding operands. As each core block is described as implementing a logical operation, the operands for the logical operation may be indicated. In addition, the sequence of execution of the logical operations may also be specified consistent with the raster operation. Due to such encoding, the execution of the logical operations (corresponding to a raster operation) may be simplified as described below.

In step 330, the core blocks are executed according to the intermediate code to perform the corresponding ROP. In general, the intermediate code needs to be interpreted consistent with the encoding approach of step 310. The core blocks are thus executed in the sequence specified by the intermediate code, using the specified operands.

The description is continued first with reference to the manner in which ROPs may be encoded in an intermediate code and then the manner in which the core blocks may be executed using the intermediate code.

5. Encoding Raster Operations

As noted in step 310, the ROP may be represented encoded in an intermediate code. In an embodiment, each raster operation may be encoded in a corresponding 32 bit number as described below. In the description below, the 32 bits are individually referred by numbers 1 through 32, with the most significant bits (e.g., bits 1 and 2) on the left hand side and the least significant bits (bits 31 and 32) on the right hand side.

The three least significant bits (position 30–32) in the 32 bit code indicate the number of Boolean operators in the raster operation. The remaining bits may be used to represent the logical operators (AND, OR, XOR) and operands (paint, source, destination) in the ROP. Each operator and operand may be respectively encoded using three bits. Bits 1 and 2 are unused.

According to a convention, the operators and operands occur alternatively in the intermediate code. Thus, bit positions 24–26, 18–20, 12–14, and 6–8 specify operators, and bit positions 27–29, 21–23, 15–17, 9–11 and 3–5 specify operands. The format of each bit group (for operands and operators) is described below.

In the case of operands, the two most significant bits (of the three bit representation) are used to indicate whether the operand is source, paint or destination. Paint may be represented by binary bits '00', source by '01' and destination by '10'. The least significant bit may be used to indicate if the operand is negated. For example, if the LSB of the operand code is set, then the operand is inverted. Thus, 001 would indicate that the operator is an inverted paint.

Similarly, the operators may also be encoded using three bits. The two most significant bits may be used to indicate whether the operator is AND, OR or XOR. In an embodiment, AND is represented by binary bits '00', OR by '01' and XOR by '10' in the two most significant bit positions. The third bit in the least significant bit position indicates whether the operator is a complex operator (described in the paragraph below).

A complex operator indicates that the result of the next operation is required to perform the operation specified by the complex operator. When the operation is performed by a complex operator, it may be referred to as complex operation and simple operation otherwise. For example, when the LSB of the AND operator is set, it indicates that a complex operation is to be performed.

The manner in which the raster operations may be encoded is described below with reference to examples.

6. Examples

An example raster operation may be specified in the PDL language as follows:

nDx(Sx(Po(DaS)))  Example (1)

wherein, 'n' represents NOT operation (inversion), 'D' represents destination, 'S' represents source, 'P' represents paint, 'x' represents XOR operation, 'a' represents 'AND' operation and 'o' represents OR operation. The manner in which the raster operation is encoded is described below.

There are four logical operations in the above example, therefore the three least significant bits (occupying positions 30–32) of the 32 bit code equals 100. The bits in positions 27–29 and 9–11 respectively equal 010 and represent the source operand (S). Bits in positions 24–26 equal 000 and represent the AND operator. Bit positions 21–23 contain '100' representing the destination operand (D).

Bit positions 18–20 equal 010 represent the OR operator and bit positions 15–17 equal bits '000' and represents the paint operand. Bit positions 12–14 and 6–8 respectively equal 100 represent the XOR operator. Bit positions 3–5 equal bits '101' and represents the inverted destination operand. Bit positions 1–2 may be occupied by '00'.

Thus, the raster operation of example (1) may be represented in the intermediate code as follows:

nDxSxPoDaS
101 100 010 100 000 010 100 000 010 100

The manner in which the intermediate code may be used to execute the ROP of example (1) is described in a section below.

In Example (1), it may be generally noted that the result generated from one logical operation forms an operand for the next logical operation in the sequence represented in the intermediate code. That is, the next logical operation is executed on the result of the current logical operation and the next operand in the sequence.

However, there could be situations in which a logical operation is to be performed on the results of two other logical operations as illustrated with reference to Example (2) below:

nSx((SxP)a(PxD))  Example (2)

In the above example, the logical operations (SxP) and (PxD) need to be performed first, and an AND operation is to be performed on the two results. A 'complex operation' may be used to indicate such a situation as described below.

A complex operator may be used to indicate that the result of the next operation is required to perform the complex operation corresponding to the complex operator. The other operand is provided by the logical operation present prior to the complex operator in the examination order.

According to a convention, the least significant bit of the 3-bit operation code representing an operator indicates whether the operation is a complex operation or a simple operation. Thus, the three bit code for a complex AND operator equals 001 (as against 000 for the simple operator).

Thus, the intermediate code for example (2) may equal:
nSxSxPaPxD4
011 100 010 100 000 001 000 100 100 100

The description is continued with reference to the manner in which the intermediate codes of above may be used to execute the core blocks to perform the corresponding raster operations.

7. Executing Core Blocks

As noted in step 330 of flow chart in FIG. 3, the core blocks are executed according to the intermediate code to perform the raster operation. The execution needs to be consistent with the approach used in encoding the core-blocks. With reference to the encoding approach described above, the execution logic may first determine the number of logical operations to be performed examining the three most significant bits of the 32 bit code. The remaining 29 bits may be examined to determine the manner in which the core blocks have to be executed.

In an embodiment, the 29 bits are examined from the least significant bit position towards the most significant bit position ("examination order") to determine the sequence in which the core blocks have to be executed. As noted above, the operation code and operands are in the alternative three-bit group positions. In case an operation code indicates that the operation is a simple operation, the result generated from one logical operation is used as an operand for the next operation. The other operand for the operation is located next to the operand in the examination order.

When an operation code indicates that the operation is a complex operation, the next logical operation is executed and the result of the next logical operation is used as an operand for the complex operation. The details of execution logic are described in further detail with reference to the intermediate code of Example (2).

With reference to the intermediate code (011 100 010 100 000 001 000 100 100 100) of Example (2) noted above, it may be determined that four core blocks have to be executed as the three most significant bits (in positions 30–32) contain the value 100. The remaining 27 bits may be examined to execute the core blocks as described below.

Operation code in bit positions 24–26 represents a simple XOR operation. Accordingly, a core block implementing XOR operation may be used. The operands for the XOR operation are specified by the two adjacent bit group positions (positions 21–23 and 27–29) as the operand code represents a simple XOR operation. Thus, a core block implementing the XOR logic may be used to perform a XOR operation on the two operands specified by the two bit groups.

The next operator in bit positions 18–20 is a complex AND operator. As described in the above section, the complex operator indicates that the result of the next operator is required for the complex operation specified by the complex operator. Therefore, the next operation specified by the XOR operator (corresponding to bit positions 12–14) is performed. The operands for the next operation are specified in bit positions 9–11 and 15–17. The AND core block (specified by bit positions 18–20) is executed by using the results of the two operations (bits 12–14 and 24–26) described above.

The next operator is the XOR (bit positions 6–8) operation between the result obtained by the execution of the complex AND operator and inverted source operand. XOR core block is used to perform the XOR operation to generate the result of the ROP. Thus, using the approaches described above, several embodiments of printer controller can be implemented. The details of implementation of an embodiment of printer controller 130 are described below.

8. Printer Controller

Figure 4:
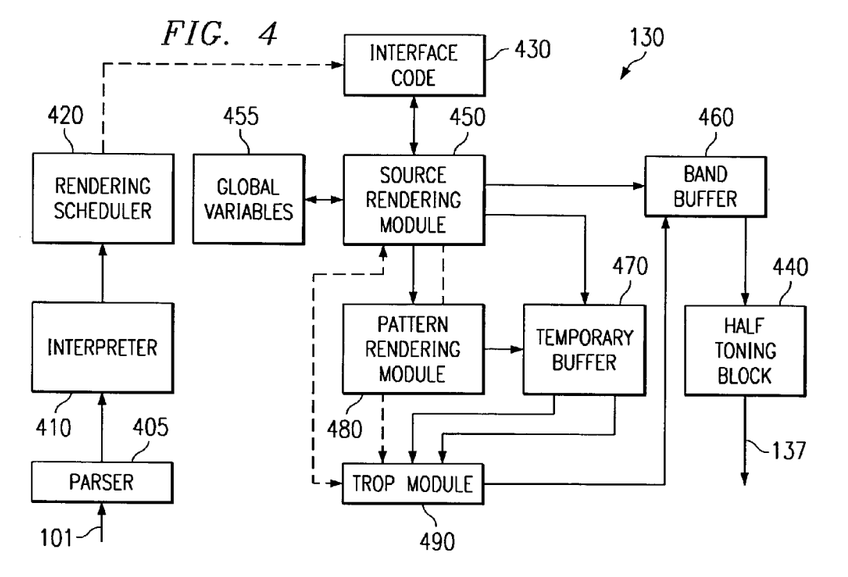
FIG. 4 is a block diagram illustrating the details of an embodiment of a printer controller implemented according to an aspect of the present invention.

FIG. 4 is a diagram illustrating the details of an embodiment of printer controller 130 implemented in accordance with the present invention. Printer controller 130 is shown containing parser 405, interpreter 410, rendering scheduler 420, interface code 430, half-toning module 440, source rendering module 450, global variables block 455, band buffer 460, temporary buffer 470, pattern rendering module 480, raster operation (ROP) module 490. In FIG. 4, the control path is represented by broken lines and data path is represented by solid lines. Each component is described in further detail below.

Parser 405 ensures that the statements (describing a page content) received on path 101 are consistent with a page description language (PDL), and passes the received statements to interpreter 410. Interpreter 410 converts any necessary statements to a corresponding display list. The display list may contain primitives (basic shapes such as trapezoids, fonts, etc.) representing the elements in the print statements. Parser 405 and interpreter 410 may be implemented in a known way.

Rendering scheduler 420 schedules the primitives for subsequent processing (rendering). One of several well known approaches may be used to implement rendering scheduler 420. Interface code 430 provides the interface between rendering scheduler 420 and source rendering module 450. In general, interface code 430 interfaces with rendering scheduler 420, and performs various initializations required for rendering modules. Rendering scheduler 420 and interface module 430 may be implemented in a known way.

Global variables 455 represents various values used for rendering and other operations which generate bit maps representing page content. For example, the variables stored may include start and end of line numbers for a band, any global clipping parameters for band, ROP value for band. In an embodiment, if ROP value is changed, the change may be inserted as a display list element for ease of processing.

Source rendering module 450 generates a bitmap for necessary elements of a display list received on from interface code 430. The generated bit map ('source element') is generally used as a source in a raster operation (ROP). As is well known with reference to PCL, each ROP is specified by three operands (source, paint and destination) using basic operations such as AND, OR, NOT and XOR.

Pattern rendering module 480 generates a paint which may be used to fill up the source described above as may be specified by the statements. In general, paint may refer to a pattern or a shade of a color used to fill up a source image. The paint thus generated by pattern rendering module 480 may also be stored in temporary buffer 470.

Temporary buffer 470 provides buffer for transfer of data between source rendering module 450, pattern rendering module 489 and ROP module 490. Half-toning block 440 half-tones a final image stored in band buffer 460 to generate a bit map suitable for sending to printer engine 170. The bit map represents the page content specified by statements received on path 101. The page content may be printed by sending the bit map to printer engine on path 137.

Raster operation (ROP) module 490 performs raster operations on the source image, paint and the destination image. The data pertaining to the source image and the paint may be received from temporary buffer 470. Typically, raster operations are performed in several iterations. In each iteration, a logical operation may be performed on the source image, paint and the destination image (which is blank initially) to generate a new destination image. The image generated at the end of all iterations represents the final image representing the page content to be printed. The final image may be stored in band buffer 460.

ROP module 490 may be implemented using the approaches described above. It should be understood that several features of the present invention can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). The manner in which ROP module 490 can be implemented substantially in the form of software is described below.

9. Software Implementation

Figure 5:
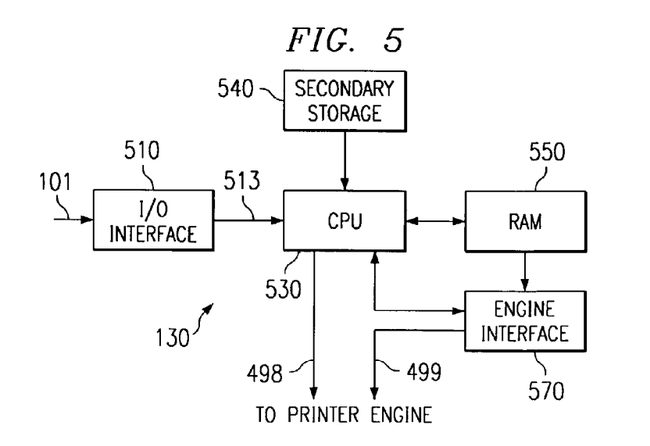
FIG. 5 is a block diagram illustrating the details of an embodiment of the present invention implemented substantially in the form of software.

FIG. 5 is a block diagram illustrating the details of printer controller 130 according to an aspect of the present invention. Printer controller 130 is shown containing input/output (I/O) interface 510, central processing unit (CPU) 530, random access memory (RAM) 550 and engine interface 570. Each component is described below in further detail.

Input/output interface 510 provides the interface with an external system such as personal computer. I/O interface receives commands on path 101 requesting to print a page content specified in a page description language (PDL) such as Printer Control Language (PCL). I/O interface 510 forwards the commands to CPU 530 on line 513.

Engine interface 570 provides an interface between printer controller 130 and printer engine 170. Lines 498 and 499 together represent line 137 illustrated in FIG. 1. Engine interface 570 may be implemented in a known way.

Secondary memory 540 may contain units such as hard drive (not shown), removable storage (e.g., flash memory, also not shown). Secondary storage 540 may store software instructions and data, which enable CPU 530 to provide several features in accordance with the present invention. The software instructions may be provided to CPU 530 from other sources such as over a network implemented using protocols such as TCP/IP.

CPU 530 executes the instructions provided from secondary memory to process the print statements and generate bit maps representing the page content, for example, as described in the previous sections. An embodiment of CPU 530 is implemented using TMS320C6211 processor available from Texas Instruments, the assignee of the subject patent application. The instructions may also cause the bitmap to be provided to printer engine 170 on path 498. RAM 550 may be used to store the instructions prior to execution. In addition, RAM 550 may be used to implement temporary buffer 570 and band buffer 560.

An embodiment of the present invention is implemented using software running (that is, executing) in printer controller 130. In this document, the term "computer program product" is used to generally refer to removable storage unit or hard disk installed in hard drive. These computer program products are means for providing software to printer 100.

The software instructions may cause CPU 530 to perform raster operations. An embodiment of CPU 530 is implemented using TMS320C6211 and 320C6211B Fixed Point Digital Signal Processors available from Texas Instruments, Inc., the assignee of the present patent application. Thus, CPU 530 may cause the intermediate code to be generated for each raster operation, and the core blocks may also be determined by execution of the instructions. In addition, the core blocks may also be implemented in the form of software as described below.

10. Performing Raster Operations in Software

The manner in which raster operations can be performed is described with reference to PCL, which defines 256 raster operations (ROPs). 12 core blocks may be implemented corresponding to the logical operations operating on different types of inputs. The pseudo-code for each core block is included below at the end of the detailed description. The 12 core blocks are summarized below:

1. To apply AND operation on two operands both to be fetched from memory. The core block is passed on the two input operand buffers. This core block may be called, for example, when ROP stands for PaS, wherein paint (P) represents pattern (bit-map) and source (S) represents an image/font (bit-map) and a logical AND (a) operation is to be performed on the two operands.

2. To apply OR operation on two operands both to be fetched from memory.

3. To apply XOR operation on two operands both to be fetched from memory.

4. To apply AND operation on two operands one to be fetched from memory and one a constant. The core block is passed on an input operand buffer and the constant operand. This core block is called, for example, when ROP stands for PaS, where paint is gray shade (constant value) and source is image/font (bit-map).

5. To apply OR operation on two operands one to be fetched from memory and one a constant operand.

6. To apply XOR operation on two operands one to be fetched from memory and one a constant operand.

7. To apply complex AND operation where the three input operands need to be fetched from memory. A complex AND operation is of type (PxS)a(PxD), where 'x' represents XOR operation and 'D' represents destination operand. The core block, in this case, is passed on the buffer containing the resultant of PxD and the other two operand buffers corresponding to S and P. This core block loads words from the three input buffers, XORs second operand and third operand, ANDs result with the first operand and stores the resultant word in the temporary ROP resultant buffer.

8. To apply complex OR operation where the first and second input operands need to be fetched from memory.

9. To apply complex AND operation where the first and second input operands need to be fetched from memory and the third operand is a constant. This is called when, for example, ROP stands for (PxS)a(PxD) and paint is a constant gray shade.

10. To apply complex OR operation where the first and second input operands need to be fetched from memory and the third operand is a constant 11. To store a constant value into memory. The core block is passed on the constant value. This is called when, say, ROP stands for just P, and paint is a constant gray shade.

12. To copy contents of one block of memory into another block. The core block is passed on the input operand buffer. This is called when, say, ROP stands for just D.

In the software implementation, the above 12 core blocks may need to be called from the appropriate modules. The intermediate code corresponding to each raster operation code may be generated before-hand, and maintained in the form of a table. A raster operation code requiring processing may be quickly mapped to the corresponding intermediate code based on the table look-up. The intermediate code can then be used to call the appropriate core blocks.

Thus, in the above-described approach, an intermediate code is generated first, and core blocks are executed based on the intermediate code. However, alternative approaches may be employed to execute raster operations using the core blocks. For example, a set of instructions may be used for each raster operation to call the core blocks required to perform logical operations defining the raster operation. The core blocks may be executed using the required operands to generate the result of the ROP.

Also, while the above-embodiments are described to perform merely the raster operations, it should be understood that additional core blocks may be implemented and used to implement other features such as transparency. In such a situation, the result of execution of the ROPs may be passed to transparency blocks.

In addition, while the core blocks are described above as being executed sequentially, it should be understood that the multiple core blocks may be executed in parallel, particularly when a complex operation is to be performed. The core blocks may be implemented using application specific integrated circuits or in software as noted above.

11. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

Appendix

The below listing contains the pseudo-code for the 12 core blocks in an embodiment implemented substantially in the form of software instructions.

1. AND operation on two operands, both to be fetched from memory

Operands: Two memory buffers

Example: ROP is PxS: Paint is pattern, Source is image/font (bit-map)

Pseudo Code:

```
CoreLoop1 (
        INT_8 *Pointer1, INT_8 *Pointer2,
        INT_8 *OutputPtr, INT_32 NumOfEntries
        )
Counter = 0
DO
DataFromPointer1 = *Pointer1
DataFromPointer2 = *Pointer2
Result = DataFromPointer1 AND DataFromPointer2
*OutputPtr = Result
    Pointer1 += 1
    Pointer2 += 1
    OutputPtr += 1
    Counter += 1
WHILE (Counter != NumOfEntries)
```

2. OR operation on two operands, both to be fetched from memory

Operands: Two memory buffers

Example: ROP is PxS: Paint is pattern, Source is image/font (bit-map)

Pseudo Code:

```
CoreLoop2 (
    INT_8 *Pointer1, INT_8 *Pointer2,
    INT_8 *OutputPtr, INT_32 NumOfEntries
    )
Counter = 0
DO
    DataFromPointer1 = *Pointer1
    DataFromPointer2 = *Pointer2
    Result = DataFromPointer1 OR DataFromPointer2
    *OutputPtr = Result
    Pointer1 += 1
    Pointer2 += 1
    OutputPtr += 1
    Counter += 1
WHILE    (Counter != NumOfEntries)
```

3. XOR operation on two operands, both to be fetched from memory
Operands: Two memory buffers
Example: ROP is PxS: Paint is pattern, Source is image/font (bit-map)
Pseudo Code:

```
CoreLoop3 (
    INT_8 *Pointer1, INT_8 *Pointer2,
    INT_8 *OutputPtr, INT_32 NumOfEntries
    )
Counter = 0
DO
    DataFromPointer1 = *Pointer1
    DataFromPointer2 = *Pointer2
    Result = DataFromPointer1 XOR DataFromPointer2
    *OutputPtr = Result
    Pointer1 += 1
    Pointer2 += 1
    OutputPtr += 1
    Counter += 1
WHILE (Counter != NumOfEntries)
```

4. AND operation on two operands, one to be fetched from memory and one a constant
Operands: One memory buffers and One constant
Example: ROP is PaS: Paint is gray shade, Source is image/font (bit-map)
Pseudo Code:

```
CoreLoop4 (
    INT_8 *Pointer1, INT_8 Constant,
    INT_8 *OutputPtr, INT_32 NumOfEntries
    )
Counter = 0
DO
    DataFromPointer1 = *Pointer1
    Result = DataFromPointer1 AND Constant
    *OutputPtr = Result
    Pointer1 += 1
    OutputPtr += 1
    Counter += 1
WHILE (Counter != NumOfEntries)
```

5. OR operation on two operands, one to be fetched from memory and one a constant
Operands: One memory buffers and One constant
Example: ROP is PoS: Paint is gray shade, Source is image/font (bit-map)

Pseudo Code:

```
CoreLoop5 (
    INT_8 *Pointer1, INT_8 Constant,
    INT_8 *OutputPtr, INT_32 NumOfEntries
    )
Counter = 0
DO
    DataFromPointer1 = *Pointer1
    Result = DataFromPointer1 OR Constant
    *OutputPtr = Result
    Pointer1 += 1
    OutputPtr += 1
    Counter += 1
WHILE (Counter != NumOfEntries)
```

6. XOR operation on two operands, one to be fetched from memory and one a constant
Operands: One memory buffers and One constant
Example: ROP is PxS: Paint is gray shade, Source is image/font (bit-map)
Pseudo Code:

```
CoreLoop6 (
    INT_8 *Pointer1, INT_8 Constant,
    INT_8 *OutputPtr, INT_32 NumOfEntries
    )
Counter = 0
DO
    DataFromPointer1 = *Pointer1
    Result = DataFromPointer1 XOR Constant
    *OutputPtr = Result
    Pointer1 += 1
    OutputPtr += 1
    Counter += 1
WHILE (Counter != NumOfEntries)
```

7. Complex AND operation on three operands, all are fetched from memory
Operands: Three memory buffers
Example: ROP is (PxS)a(PxD): The core loop is passed the buffer containing the resultant of PxD and the other two operands buffers corresponding to S and P
Pseudo Code:

```
CoreLoop7 (
    INT_8 *Pointer1, INT_8 *Pointer2, INT_8 *Pointer3,
    INT_8 *OutputPtr, INT_32 NumOfEntries
    )
Counter = 0
DO
    DataFromPointer1 = *Pointer1
    DataFromPointer2 = *Pointer2
    DataFromPointer3 = *Pointer3
    Result = (DataFromPointer1 XOR DataFromPointer2)
        AND DataFromPointer3
    *OutputPtr = Result
    Pointer1 += 1
    Pointer2 += 1
    Pointer3 += 1
    OutputPtr += 1
    Counter += 1
WHILE (Counter != NumOfEntries)
```

8. Complex OR operation on three operands, all are fetched from memory
Operands: Three memory buffers
Example: ROP is (PxS)o(PxD): The core loop is passed the buffer containing the resultant of PxD and the other two operands buffers corresponding to S and P
Pseudo Code:

```
CoreLoop8 (
        INT_8 *Pointer1, INT_8 *Pointer2, INT_8 *Pointer3,
        INT_8 *OutputPtr, INT_32 NumOfEntries
        )
    Counter = 0
    DO
        DataFromPointer1 = *Pointer1
        DataFromPointer2 = *Pointer2
        DataFromPointer3 = *Pointer3
        Result = (DataFromPointer1 XOR DataFromPointer2)
            OR DataFromPointer3
        *OutputPtr = Result
        Pointer1 += 1
        Pointer2 += 1
        Pointer3 += 1
        OutputPtr += 1
        Counter += 1
    WHILE (Counter != NumOfEntries)
```

9. Complex AND operation on three operands, two are fetched from memory and one is a constant
Operands: Two memory buffers and one constant.
Example: ROP is (PxS)a(PxD): Paint is a constant gray value. The core loop is passed the buffer corresponding to resultant of PxD, the operand buffer S and the constant Paint value
Pseudo Code:

```
CoreLoop9 (
        INT_8 *Pointer1, INT_8 *Pointer2, INT_8 Constant,
        INT_8 *OutputPtr, INT_32 NumOfEntries
        )
    Counter = 0
    DO
        DataFromPointer1 = *Pointer1
        DataFromPointer2 = *Pointer2
        Result = (DataFromPointer1 XOR Constant)
            AND DataFromPointer2
        *OutputPtr = Result
        Pointer1 += 1
        Pointer2 += 1
        OutputPtr += 1
        Counter += 1
    WHILE (Counter != NumOfEntries)
```

10. Complex OR operation on three operands, two are fetched from memory and one is a constant
Operands: Two memory buffers and one constant.
Example: ROP is (PxS)o(PxD): Paint is a constant gray value. The core loop is passed the buffer corresponding to resultant of (PxD), operand buffer S and constant Paint value.
Pseudo Code:

```
CoreLoop10 (
        INT_8 *Pointer1, INT_8 *Pointer2, INT_8 Constant,
        INT_8 *OutputPtr, INT_32 NumOfEntries
        )
    Counter = 0
    DO
        DataFromPointer1 = *Pointer1
        DataFromPointer2 = *Pointer2
        Result = (DataFromPointer1 XOR Constant)
            OR DataFromPointer2
        *OutputPtr = Result
        Pointer1 += 1
        Pointer2 += 1
        OutputPtr += 1
        Counter += 1
    WHILE (Counter != NumOfEntries)
```

11. Render memory with a constant value
Operands: The constant value is passed.
Example: ROP is P: Paint is a constant gray value.
Pseudo Code:

```
CoreLoop11 ( INT_8 Constant, INT_8 *OutputPtr,
        INT_32 NumOfEntries )
    Counter = 0
    DO
        *OutputPtr = Constant
        OutputPtr += 1
        Counter += 1
    WHILE (Counter != NumOfEntries)
```

12. Copy one block of memory into another
Operands: Two memory buffers
Example: ROP is D.
Pseudo Code:

```
CoreLoop12 ( INT_8 *Pointer1, INT_8 *OutputPtr,
        INT_32 NumOfEntries )
    Counter = 0
    DO
        DataFromPointer1 = *Pointer1
        *OutputPtr = DataFromPointer1
        Pointer1 += 1
        OutputPtr += 1
        Counter += 1
    WHILE (Counter != NumOfEntries)
```

Each of the above core loop is also passed on the flags which indicate whether any of the operands need to be negated before applying the Boolean operations or not. Thus, no separate core block is written to apply the NOT Boolean operation.

What is claimed is:
1. A method of implementing a raster operation in a printer, wherein each of plurality of raster operations can be defined by a plurality of logical operations, each of said plurality of logical operations being performed using one or more of a paint, a source and a destination, said method comprising:
   providing a plurality of core blocks, each of said plurality of core blocks implementing one of said plurality of logical operations, said plurality of core blocks selected whereby each of the plurality of raster operation may be implemented by execution of one or more of the plurality of core blocks;
   encoding each raster operation as an intermediate code, each intermediate code indicating a number of core blocks, a sequence of a plurality of core blocks and corresponding operands; and executing one or more of said plurality of core blocks as defined by a corresponding intermediate code to perform said corresponding one of said plurality of raster operations.

2. The method of claim 1, wherein said plurality of core blocks consist of the following 12 logical operations
(1) an AND operation on two operands both fetched from memory,
(2) an OR operation on two operands both fetched from memory,
(3) an XOR operation on two operands both fetched from memory,
(4) an AND operation on two operands one fetched from memory and one a constant operand,
(5) an OR operation on two operands one fetched from memory and one a constant operand,
(6) an XOR operation on two operands one fetched from memory and one a constant operand,
(7) a first complex AND operation consisting of an XOR operation on first and second operands fetched from memory and an AND operation on the XOR result and a third operand fetched from memory,
(8) a first complex OR operation consisting of an XOR operation on first and second operands fetched from memory and an OR operation of the XOR result and a third operand fetched from memory,
(9) a second complex AND operation consisting of an XOR operation on a first operand fetched from memory and a second constant operand, and an AND operation of the XOR result and a third operand fetched from memory,
(10) a second complex OR operation consisting of an XOR operation on first and second operands fetched from memory and an OR operation of the XOR result and a third constant operand,
(11) storing a constant operand into memory, and
(12) copying a first operand fetched from memory into memory.

3. The method of claim 1, wherein:
each intermediate code consists of a first bit field indicating a number of Boolean operations, a plurality of second bit fields each indicating one of a paint, a source or a destination operand, and a plurality of third bit fields each indicating one of an AND operation, an OR operation or an XOR operation.

4. The method of claim 3, wherein:
each of said second bit fields of each intermediate code consists of two bits indicating one of a paint, a source or a destination operand and a bit indicating whether the operand is to be inverted.

5. The method of claim 3, wherein:
said intermediate code includes alternating second bit fields and third bit fields; and
each of said third bit fields of each intermediate code consists of two bits indicating one of an AND operation, an OR operation or an XOR operation and a bit indicating whether one operand is indicated by an adjacent second bit field or the one operand is a result of an operation indicated by a next adjacent third bit field.

6. A printer controller for performing a raster operation, wherein each of plurality of raster operations can be defined by a plurality of logical operations, each of said plurality of logical operations being performed using one or more of a paint, a source and a destination, said printer controller comprising:
means for providing a plurality of core blocks, each of said plurality of core blocks implementing one of said plurality of logical operations, said plurality of core blocks selected whereby each of the plurality of raster operation may be implemented by execution of one or more of the plurality of core blocks;
means for encoding each raster operation as an intermediate code, each intermediate code indicating a number of core blocks, a sequence of a plurality of core blocks and corresponding operands; and
means for executing one or more of said plurality of core blocks as defined by a corresponding intermediate code to perform said corresponding one of said plurality of raster operations.

7. The printer controller of claim 6, wherein said plurality of core blocks consist of the following 12 logical operations
(1) an AND operation on two operands both fetched from memory,
(2) an OR operation on two operands both fetched from memory,
(3) an XOR operation on two operands both fetched from memory,
(4) an AND operation on two operands one fetched from memory and one a constant operand,
(5) an OR operation on two operands one fetched from memory and one a constant operand,
(6) an XOR operation on two operands one fetched from memory and one a constant operand,
(7) a first complex AND operation consisting of an XOR operation on first and second operands fetched from memory and an AND operation on the XOR result and a third operand fetched from memory,
(8) a first complex OR operation consisting of an XOR operation on first and second operands fetched from memory and an OR operation of the XOR result and a third operand fetched from memory,
(9) a second complex AND operation consisting of an XOR operation on a first operand fetched from memory and a second constant operand, and an AND operation of the XOR result and a third operand fetched from memory,
(10) a second complex OR operation consisting of an XOR operation on first and second operands fetched from memory and an OR operation of the XOR result and a third constant operand,
(11) storing a constant operand into memory, and
(12) copying a first operand fetched from memory into memory.

8. The printer controller of claim 6, wherein:
each intermediate code consists of a first bit field indicating a number of Boolean operations, a plurality of second bit fields each indicating one of a paint, a source or a destination operand, and a plurality of third bit fields each indicating one of an AND operation, an OR operation or an XOR operation.

9. The printer controller of claim 8, wherein:
each of said second bit fields of each intermediate code consists of two bits indicating one of a paint, a source or a destination operand and a bit indicating whether the operand is to be inverted.

10. The printer controller of claim 8, wherein:
said intermediate code includes alternating second bit fields and third bit fields; and each of said third bit fields of each intermediate code consists of two bits indicating one of an AND operation, an OR operation or an XOR operation and a bit indicating whether one operand is indicated by an adjacent second bit field or the one operand is a result of an operation indicated by a next adjacent third bit field.

11. A computer readable medium carrying one or more sequences of instructions for implementing a raster operation in a printer, wherein each of plurality of raster operations can be defined by a plurality of logical operations, each of said plurality of logical operations being performed using one or more of a paint, a source and a destination, wherein execution of said one or more sequences of instructions by one or more processors contained in said printer causes said one or more processors to perform the actions of:

providing a plurality of core blocks, each of said plurality of core blocks implementing one of said plurality of logical operations, said plurality of core blocks selected whereby each of the plurality of raster operation may be implemented by execution of one or more of the plurality of core blocks;

encoding each raster operation as an intermediate code, each intermediate code indicating a number of core blocks, a sequence of a plurality of core blocks and corresponding operands; and executing one or more of said plurality of core blocks as defined by a corresponding intermediate code to perform said corresponding one of said plurality of raster operations.

12. The computer readable medium of claim 11, wherein said plurality of core blocks consist of the following 12 logical operations (1) an AND operation on two operands both fetched from memory,
   (2) an OR operation on two operands both fetched from memory,
   (3) an XOR operation on two operands both fetched from memory,
   (4) an AND operation on two operands one fetched from memory and one a constant operand,
   (5) an OR operation on two operands one fetched from memory and one a constant operand,
   (6) an XOR operation on two operands one fetched from memory and one a constant operand,
   (7) a first complex AND operation consisting of an XOR operation on first and second operands fetched from memory and an AND operation on the XOR result and a third operand fetched from memory,
   (8) a first complex OR operation consisting of an XOR operation on first and second operands fetched from memory and an OR operation of the XOR result and a third operand fetched from memory,
   (9) a second complex AND operation consisting of an XOR operation on a first operand fetched from memory and a second constant operand, and an AND operation of the XOR result and a third operand fetched from memory,
   (10) a second complex OR operation consisting of an XOR operation on first and second operands fetched from memory and an OR operation of the XOR result and a third constant operand,
   (11) storing a constant operand into memory, and
   (12) copying a first operand fetched from memory into memory.

13. The computer readable medium of claim 11, wherein:
each intermediate code consists of a first bit field indicating a number of Boolean operations, a plurality of second bit fields each indicating one of a paint, a source or a destination operand, and a plurality of third bit fields each indicating one of an AND operation, an OR operation or an XOR operation.

14. The computer readable medium of claim 13, wherein:
each of said second bit fields of each intermediate code consists of two bits indicating one of a paint, a source or a destination operand and a bit indicating whether the operand is to be inverted.

15. The computer readable medium of claim 13, wherein:
said intermediate code includes alternating second bit fields and third bit fields; and
each of said third bit fields of each intermediate code consists of two bits indicating one of an AND operation, an OR operation or an XOR operation and a bit indicating whether one operand is indicated by an adjacent second bit field or the one operand is a result of an operation indicated by a next adjacent third bit field.

* * * * *